United States Patent Office 3,847,913
Patented Nov. 12, 1974

3,847,913
CEPHALOSPORANIC ACID ESTERS
Wagn Ole Gudtfredsen, Vaerlose, Denmark, assignor to Lovens Kemiske Fabrik Produktionsaktieselskab, Ballerup, Denmark
No Drawing. Original application Jan. 28, 1969, Ser. No. 794,751, now Patent No. 3,655,658. Divided and this application Dec. 9, 1971, Ser. No. 206,565
Claims priority, application Great Britain, Jan. 30, 1968, 4,821/68
Int. Cl. C07d 99/24
U.S. Cl. 260—243 C                          2 Claims

ABSTRACT OF THE DISCLOSURE

The invention relates to new cephalosporanic acid esters of the formula

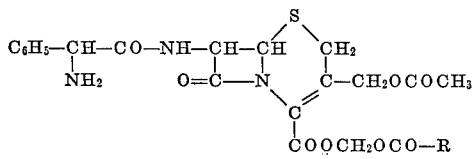

and their salts with non-toxic, pharmaceutically acceptable acids, R in said formula representing hydrogen, an alkyl group, a cycloalkyl group, a cycloalkyl-alkyl group, or an aralkyl group, to methods of producing the said compounds, and to pharmaceutical preparations containing the said compounds as active ingredients.

---

This is a division of application Ser. No. 794,751, filed Jan. 28, 1969, now Pat. No. 3,655,658.

This invention relates to a group of new esters of 7 - (α-amino-α-phenylacetamido)-cephalosporanic acid, these esters having the following formula:

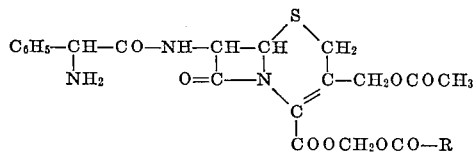

in which R is hydrogen, an alkyl radical, a cycloalkyl or a cycloalkyl-alkyl radical, an aryl or an aralkyl radical; and to salts of these compounds with non-toxic, pharmaceutically acceptable acids.

In particular, R may represent a lower alkyl radical, such as methyl, ethyl, propyl, isopropyl, butyl, isobutyl, tert. butyl, pentyl, and the like; a monocyclic cycloalkyl radical having from three to seven carbon atoms; a bicyclic cycloalkyl radical, such as 1-bicyclo-[2.2.2]-octyl or adamantyl radical; a monocyclic aryl radical, such as a phenyl or substituted phenyl radical; a bicyclic aryl radical, such as a 1-naphthyl, 2-naphthyl, or substituted naphthyl radical; a mono- or bicyclic aralkyl radical, such as benzyl, phenylethyl, or naphthyl lower alkyl, such as naphthylmethyl, and the like.

Examples of substituents in the above mentioned ring systems include lower alkyl radicals, lower alkoxy radicals, lower alkyl mercapto radicals, halogen atoms, halo-lower alkyl radicals, such as mono-, di-, or tri-halo-alkyl radicals, of which the halogen can be fluorine, chlorine or bromine, or nitro groups. Examples of acids which can be used to form the salts include inorganic acids, such as hydrochloric, hydrobromic, hydroiodic acid, sulphuric acid and the like, and organic acids such as acetic, citric, tartaric, maleic acids and the llike.

Due to the asymmetric carbon atom in the side chain of the compounds of formula (I) these compounds exist in two epimeric forms, and the invention comprises both of the epimeric forms as well as the mixtures thereof.

As is well known, 7-(α-amino-α-phenylacetamido)-cephalosporanic acid has broad spectrum antibiotic activity in vitro, but its use in human therapy is limited due to its inadequate absorption by oral administration. It is, therefore, an object of the present invention to provide new derivatives of 7-(α-amino-α-phenylacetamido)-cephalosporanic acid which are more readily absorbed and distributed in the organism than is the parent compound. According to experiments performed in connection with the present invention, it has been found that the aforesaid disadvantage can be overcome by administering the said 7-(α-amino-α-phenylacetamido)-cephalosporanic acid in the form of esters of formula (I), which esters are readily absorbed and distributed in the organism, giving rise to exceptionally high concentrations of 7-(α-amino-α-phenylacetamido)-cephalosporanic acid in blood and tissues due to enzymatic cleavage of the ester.

In Table I below is shown that the concentrations obtained in various organs, such as the liver, kidneys, spleen and lung, are considerably higher after administration of the pivaloyloxymethyl ester of 7-[D(—)-α-amino-α-phenylacetamido]-cephalosporanic acid than after administration of a corresponding dose of 7-[D(—)-α-amino-α-phenylacetamido]-cephalosporanic acid.

TABLE I

Concentrations of 7[D(—)-α-amino-α-phenylacetamido]-cephalosporanic acid in serum and organs from rats after oral administration of—
(A)7-[D(—)-α-amino-α-phenylacetamido]-cephalosporanic acid (100 mg./kg.)
(B)Pivaloyloxymethyl 7-[D(—)-α-amino-α-phenylacetamido]-cephalosporanate, hydrochloride (137 mg./kg.) equivalent to 100 mg./kg. of 7-[D(—)-α-amino-α-phenylacetamido]-cephalosporanic acid

| Site | μg. per ml. or per g. wet weight of serum and tissues, respectively | | | | | |
|---|---|---|---|---|---|---|
| | ½ hour | | 1 hour | | 2 hours | |
| | A | B | A | B | A | B |
| Serum | 3.8 | 10.8 | 5.2 | 10.8 | 2.2 | 4.7 |
| Liver | 3.7 | 25.2 | 4.7 | 18.0 | 2.3 | 6.5 |
| Kidney | 14.1 | 18.0 | 16.5 | 24.3 | 9.2 | 13.1 |
| Spleen | 0.54 | 1.7 | 0.50 | 3.4 | 0.23 | 0.61 |
| Lung | 1.9 | 4.1 | 1.3 | 4.3 | 0.63 | 1.8 |

The compounds of formula (I) are well tolerated substances which, either as such or in form of one of their salts, may be administered enterally as well as parenterally and preferably orally in any of the known forms of pharmaceutical preparations usually mixed up with a solid carrier and/or auxiliary agents.

In such compositions, the proportion of therapeutically active material to carrier substance and auxiliary agent can vary between 1% and 95%. The compositions can either be worked up to pharmaceutical forms of presentation, such as tablets, pills or dragees, or can be filled in medical containers such as capsules, or as far as mixtures are concerned filled into bottles. Pharmaceutical organic or inorganic solid or liquid carriers suitable for oral, enteral or topical administration can be used to make up the composition. Gelatine, lactose, starch, magnesium, stearate, talc, vegetable and animal fats and oils, gums, polyalkylene glycol, or other known carriers for medicaments are all suitable as carriers. The preferred salt of the compositions may contain other pharmaceutically acorganic or organic acids including antibiotically active acids may be used, e.g. the phosphate, the acetate, the phenoxymethylpenicillinate, and the like. Furthermore, the compositions may cntain other pharmaceutically active components which can appropriately be administered together with the ester in the treatment of infectious diseases, such as other suitable antibiotics.

Another object of the invention resides in the selection of a dose of the esters and their salts which can be administered so that the desired activity is achieved without simultaneous secondary effect.

The esters and their salts are conveniently administered in dosage units containing not less substance than corresponding to 0.025 g. and not more than corresponding to 1 g. of 7-[D(—)-α-amino-α-phenylacetamido]-cephalosporanic acid and preferably to from 0.1 to 0.8 g. By the term "dosage unit" is meant a unitary, i.e. a single dose capable of being administered to a patient, and which may be readily handled and packed, remaining as a physically stable unit dose, comprising either the active material as such or a mixture of it with a solid pharmaceutical carrier.

In the form of a dosage unit the compound may be administered once or several times a day at appropriate intervals, always depending, however, on the condition of the patient.

Thus a daily dose will preferably amount to from 1 to 3 g. of the compound of the invention calculated as 7-[α-amino-α-phenylacetamido]-cephalosporanic acid.

The dosage unit for oral or enteral administration may be in the form of a tablet or a capsule. For oral treatment, the composition may be in the form of a non-aqueous suspension of a salt of a compound of the formula (I) with a pharmaceutically acceptable acid and containing the salts in amounts from 10 to 50 mg. of the active compund per ml. of the non-aqueous vehicle. For topical treatment, the composition may be in the form of a non-aqueous ointment or cream and containing the active compound in amounts corresponding to ¼ to 10 g. of 7-(α-amino-α-phenylacetamido)-cephalosporanic acid per 100 g. of the preparation.

It is a further object of the present invention to provide methods of producing the compounds of formula (I).

One method comprises a first step in which a 7-(α-R'-α-phenylacetamido)-cephalosporanic acid or a reactive derivative thereof of the formula (II) is reacted with a compound of formula (III) according to the following reaction scheme:

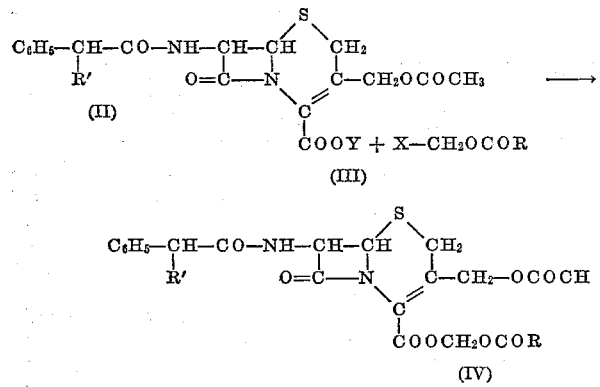

in which R is as defined above, R' is an amino group, a protected amino group, or another group which, after the above reaction has taken place, can be transformed into an amino group, such as an azido or a nitro group, or a halogen atom, Y is hydrogen or a cation such as an alkali metal or a tertiary amine, and X is a halogen atom, preferably chlorine or bromine, an acyloxy radical or an alkyl or arylsulphonyloxy radical.

The compounds of formula (IV) formed by the above reaction are esters of 7-(α-R'-α-phenylacetamido)-cephalosporanic acid, and are new compounds. When R' is an amino group, formula (IV) represents the compounds of the invention, whereas when R' has the other meanings defined above, the compounds of formula (IV) represent interesting intermediates in the synthesis of the compounds of the present invention and constitute, as such, a part of this invention. As a common characteristic of the substituent R' it can be said that it is selected from groups which are capable of being converted to an amino group by means of methods mild enough to avoid a destruction of the molecule at the ester group or at the lactam ring. In particular, the substituent R' may be a substituted amino group having the formula Z—NH— where Z is a benzyloxycarbonyl radical, a p-halo, p-nitro, or p-methoxybenzyloxycarbonyl radical, an allyloxycarbonyl radical, or some sulphur-containing radicals, such as tritylsulphenyl radical, an arylsulphenyl radical, e.g. an o-nitrophenylsulphenyl radical. Furthermore Z may be triphenylmethyl (also called a trityl) radical, a tertiary butoxycarbonyl radical, a β-dicarbonyl protective radical, such as benzoylacetonyl and some enamines or Schiff bases. In general any group or radical which can be split off by catalytic hydrogenation or by mild acid hydrolysis will be suitable, since experiments have shown that the esters of formula (I) are stable under such conditions.

It will be understood that the methods of preparing the compounds of formula (I) from the compounds of formula (IV) depend on the substituent R'. The conversion of the substituent R' into a free amino group is made by commonly known processes, especially as known from the peptide chemistry.

Some of the starting compounds of formula (II) are known from the synthesis of 7-(α-amino-α-phenylacetamido)-cephalosporanic acid (J. Med. Chem. 9, 746, (1966)). Others can be prepared according to methods known from peptide chemistry. The starting compounds of formula (III) are mostly known, and the new ones can be prepared in the same way as the known compounds, using methods which are standard procedures for this type of compound. Among such methods may be mentioned the reaction of an acid halide with paraformaldehyde (as described e.g. in J.A.C.S. 43,660, (1921)), or the halogenation of methyl esters (as described e.g. in Acta. Chem. Scand. 20, 1273, (1966)).

The reaction of the compounds of formula (II) with the compounds of formula (III) can be performed at or below room temperature or by gentle heating in some cases up to the boiling point of the solvent, depending on the meaning of Y and X and the solvent used. Different organic solvents or mixtures thereof with water may be used, e.g. acetone, dioxane tetrahydrofuran, methylene chloride, and dimethylformamide.

The reaction products are mostly oily products, which can be used in the next step without further purification. By repeated precipitations they can be obtained as amorphous powders.

The subsequent reaction step by which the R group is converted into an amino group may be effected with different methods known from peptide syntheses depending on what R stands for.

Catalytic hydrogenation will be preferred when R has the formula Z—NH— and Z stands for benzyloxycarbonyl and related derivatives thereof, and for trityl. This hydrogenation is preferably performed at room temperature and at atmospheric or slightly elevated pressure in a solvent which may be a non-reducible organic solvent or a mixture thereof with water.

The preferred catalysts are noble metal catalysts, such as palladium or platinum, or Raney nickel, but others can be used as well. A mild acid hydrolysis is preferred in the case where Z stands for a sulphur containing group, an enamine or Schiff base, for instance at pH=2 in a dilute solution of hydrogen chloride in aqueous acetone. A treatment with formic acid at room temperature is especially suitable for the removal of Z, when Z is a tertiary butoxycarbonyl or a β-dicarbonyl protective radical. Also known from the literature is the removal of the o-nitrophenylsulphenyl radical involving a nucleophilic attack on the sulphur atom of the sulphenamide group. In the present case, the best yields were obtained with sodium or potassium iodide, sodium thiosulphate, sodium hydrogen sulphide, sodium dithionite, and potassium thiocyanate. Other sulphenamide groups can be cleaved in the same way. If R is an azido or a nitro group or a halogen atom, especially a bromine atom, these groups may be transformed into the free amino group in known manner, the azido and the nitro group by a reduction with a noble metal catalyst and hydrogen, or with Raney nickel, and the halogen atom by an amination, for instance with hexamethylene tetramine.

In the case where R' represents an amino group, the compounds of formula (I) can be obtained in one step by reacting the free 7 - (α-amino-α-phenylacetamido)-cephalosporanic acid or a salt thereof, such as an alkali metal salt, the triethylamine salt or salts with other amines, with a compound of formula (III).

The reaction can be carried out in different organic solvents, such as acetone, dimethylformamide, tetrahydrofuran or methylene chloride or in mixtures of such solvents with a minor amount of water. The reaction temperature may be room temperature or the mixture may be slightly heated depending on the starting compounds and the solvents.

Another suitable method for the preparation of the compounds of the invention comprises the reaction of a reactive derivative of an α-substituted phenylacetic acid of the formula (V) with an ester of 7-aminocephalosporanic acid of the formula (VI) whereby a product of the above formula (IV) is obtained:

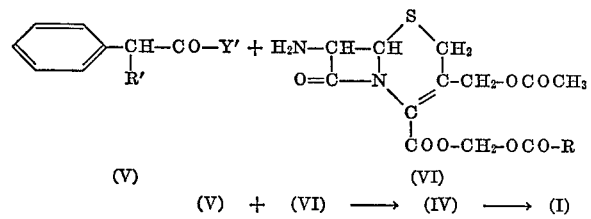

(V)        (VI)

(V) + (VI) ⟶ (IV) ⟶ (I)

In the formula (V) R' has the same meaning as in formula (II); in the formula (VI) R has the meaning defined under formula (I); —CO—Y' represents a radical capable of reacting with the NH₂ group in the compound (VI) to form a CO—NH bridge. For instance CO—Y' can be an acid halide, such as an acid chloride or bromide; an anhydride; a mixed anhydride with an alkyl-carbonic acid, such as isobutyl-carbonic acid, or a carboxylic acid, an inorganic acid or a sulphonic acid; or a derivative obtained by reacting a carboxylic acid with a carbodiimide or N,N'-carbonyldimidazole or similarly functioning compound.

The reaction can be performed in an organic solvent or in a mixture thereof with water either at a low temperature or at slightly elevated temperature. Suitable solvents are methylene chloride, chloroform, acetone, dimethylformamide or dimethylacetamide, ether, tetrahydrofuran, dioxane or similar inert solvents.

The reaction products may be isolated in conventional manner, e.g. by precipitation or by removal of the solvent followed by recrystallization from a solvent. The starting compounds of formula (V) are known compounds which can be prepared by standard methods known from the peptide chemistry.

The compounds of formula (VI) are new compounds and are interesting intermediates in the synthesis of the compounds of formula (I) and constitute as such a part of this invention. They can be prepared by reacting 7-aminocephalosporanic acid in the form of a salt, such as an alkali metal salt or the triethylammonium salt, with a compound of formula (III). The 7-aminocephalosporanic acid may be used as such or the 7-amino group may be protected, for instance with a triphenylmethyl radical or other radical for protecting the amino group during the esterification process. Only protective radicals which are easily removed without causing any destruction of the lactam ring or the ester group are suitable in this case. The reaction is performed in an inert organic solvent, such as acetone, dimethylformamide or methylene chloride, and at room temperature or slightly elevated temperatures. When the amino group has been protected, the removal of this protecting group can be performed by methods known from the literature.

The reaction products of formula (VI) are conveniently isolated as their acid addition salts with for instance p-toluenesulphonic acid or other inorganic or organic acids such as sulphuric, phosphoric, hydrochloric, acetic, maleic, tartaric and the like.

The invention is illustrated by the following non-limiting Examples:

EXAMPLE 1

(A) Potassium 7-[D(—)-α-azidophenylacetamido]-cephalosporanate

A solution of 7-amino-cephalosporanic acid (3.89 g.) and sodium bicarbonate (3.89 g.) in a mixture of water (200 ml.) and acetone (160 ml.) was cooled in an ice bath. While stirring a solution of D(—)-α-azidophenylacetyl chloride (2.66 g.) in acetone (25 ml.) was added dropwise over 1 hour.

After stirring for additional 1.5 hours, the acetone was removed by three washings with ether. The aqueous phase was layered with ethyl acetate and pH adjusted to 2.

The acid was extracted back into 50 ml. of water by adjusting the mixture to pH 6 with 1 N potassium hydroxide. The aqueous phase was separated and, after adding n-butanol, the water was removed in vacuo to yield the desired compound as a white crystalline product with a melting point of 145–147° C. (dec.), $[\alpha]_D^{20} = +31.5°$ (c.=1, H₂O) UV-spectrum:

$$\lambda_{max.}^{H_2O}$$

=260 mμ (ε=8700).

The NMR-spectrum (in D₂O with TMS as external reference) showed signals at δ=2.07(s); 3.18(d); 3.52(d); 4.71(d); 4.89(d); 5.05(d); 5.34(s); 5.70(d); 7.47(s).

The IR-spectrum (0.3% in KBr) showed strong bands at 2130, 1762, 1695, 1668, 1615, 1393, 1350, and 1230 cm.⁻¹.

(B) Picaloyloxymethyl 7-[D(—)-α-azidophenylacetamido]-cephalosporanate

To a suspension of potassium 7-[D(—)-α-azidophenylacetamido]-cephalosporanate (4.70 g.) and potassium bicarbonate (1.5 g.) in acetone (100 ml.) and 10% aqueous sodium iodide (2 ml.), chloromethylpivalate (2.7 ml.) was added and the mixture refluxed for 2 hours. After cooling, the suspension was filtered and the filtrate evaporated to dryness in vacuo.

The remaining residue was washed repeatedly by decantation with petroleum ether to remove unreacted chloromethyl pivalate. The oily residue was taken up in ethyl acetate (100 ml.), and the resulting solution washed with aqueous sodium bicarbonate and water, dried, and evaporated in vacuo to yield a crude product as an amorphous powder.

Purification by chromatography on silicagel yielded the desired compound as an amorphous powder.

The NMR-spectrum (in CDCl₃ with TMS as internal reference) showed signals at δ=1.20(s); 2.05(s); 3.41(d); 3.55(d); 5.00(d); 5.05(s); 5.15(s); 5.80(d); 5.90(d); 5.92(d) 7.13(d); 7.43(s).

In the same way the acetoxymethyl-, propionyloxymethyl- and benzoyloxymethyl esters were prepared by using the corresponding chloromethyl esters instead of chloromethyl pivalate.

(C) Pivaloylmethyl 7-[D(—)-α-aminophenylacetamido]-cephalosporanate, hydrochloride To a solution of pivaloyloxymethyl 7-[D(—)-α-azidophenylacetamido]-cephalosporanate (10 g.) in ethyl acetate (150 ml.) were added water (50 ml.) and 10% palladium on carbon catalyst (5. g.) in a flask equipped with an efficient stirrer, a gas inlet tube, a gas outlet tube, a glass calomel combination electrode, and a burette controlled by an automatic titrator. The system was flushed with nitrogen, whereafter a stream of hydrogen was bubbled through the suspension with stirring, the aqueous phase being maintained at a pH of 3.0 by addition of 1 N hydrochloric acid via the automatic titrator.

When the consumption of acid stopped, the flask was flushed with nitrogen until all hydrogen was removed, and the catalyst was filtered off. The filtrate separated into two phases which were separated, and the aqueous phase was washed with ether and freeze-dried. The desired compound was obtained as a colourless amorphous powder, easily soluble in water.

The NMR-spectrum (in $D_2O$ with $TMS/CDCl_3$ as external reference) showed signals at $\delta = 1.15(s); 2.03(s); 3.35(d); 3.55(d); 4.90(s); 5.10(d); 5.28(s); 5.73(d); 5.83(d); 5.95(d); 7.55(s)$.

In the same way the acetoxymethyl-, propionyloxymethyl- and benzoyloxymethyl esters of 7-[D(—)-α-aminophenylacetamido]-cephalosporanic acid were prepared from the corresponding esters of 7-[D(—)-α-azidophenylacetamido]-cephalosporanic acid mentioned in Example 1 B. The compounds were isolated as their hydrochlorides.

EXAMPLE 2

(A) Pivaloyloxymethyl 7-aminocephalosporanate, hydrochloride

A mixture of 7-aminocephalosporanic acid (6.8 g.), dimethyl formamide (25 ml.) and triethylamine (4.9 ml.) was stirred at room temperature for 30 minutes, whereafter chloromethyl pivalate (7.4 ml.) was added. The mixture was stirred at room temperature for 3 hours. After diluting the mixture with ethyl acetate (75 ml.) it was extracted with water (4×25 ml.) to remove the dimethylformamide and unreacted 7-aminocephalosporanic acid.

The organic layer was dried and evaporated to dryness in vacuo to yield an oil consisting of a mixture of pivaloyloxymethyl 7-aminocephalosporanate and the corresponding $\Delta^2$-compound. After separation by chromatography the pivaloyloxymethyl 7 - aminocephalosporanate was dissolved in ethyl acetate, water was added and while stirring, the pH was adjusted to 3 by addition of 1 N hydrochloric acid. The aqueous phase was separated and freeze-dried to yield the desired compound as an amorphous powder.

In the same way the acetoxymethyl-, propionyloxymethyl- and benzoyloxymethyl esters of 7-aminocephalosporanic acid were prepared by using the corresponding chloromethyl esters instead of chloromethyl pivalate. The compounds were isolated as their hydrochlorides.

(B) Pivaloyloxymethyl 7-[D(—)-α-aminophenylacetamido]-cephalosporanate, hydrochloride Pivaloyloxymethyl 7 - aminocephalosporanate, hydrochloride (4.3 g.) was suspended with efficient stirring in dry, ethanol-free chloroform (50 ml.) at 0° C. Sodium bicarbonate (2.2 g.) was added, followed by D(—)-α-phenylglycyl chloride, hydrochloride (2.5 g.), prepared according to J. Org. Chem. 31, 897 (1966). Stirring was maintained for 3 hours at 0° C. The mixture was filtered through diatomaceous earth, and the clear filtrate was evaporated in vacuo. The oily residue was dissolved in water, and the solution was freeze-dried to yield the desired compound as an amorphous powder, which was identical with the product prepared in Example 1(C).

In a manner analogous with that described in the procedure above the acetoxymethyl-, propionyloxymethyl- and benzoyloxymethyl esters of 7-[D(—)-α-aminophenylacetamido]-cephalosporanic acid were prepared. These esters were identical with the compounds prepared analogous to Example 1(C).

By substituting L(+)-α-phenylglycyl chloride for D(—)-α-phenylglycyl chloride in the above example pivaloyloxymethyl 7-[L(+) - α - aminophenylacetamido]-cephalosporanate, hydrochloride was obtained.

EXAMPLE 3

(A) 7-[D(—)-α - p - nitrobenzyloxycarboxamidophenylacetamido] - cephalosporanic acid pivaloyloxymethyl ester To a suspension of potassium 7-[D(—)-α-p-nitrobenzyloxycarboxamido-phenylacetamido] - cephalosporanate (6.25 g.) in acetone (100 ml.) was added 10% aqueous sodium iodide (2 ml.) and chloromethyl pivalate (2.7 ml.), whereafter the mixture was refluxed for 2 hours. After cooling, the suspension was filtered and the filtrate evaporated to dryness in vacuo. The residue was washed repeatedly by decantation with petroleum ether to remove excess chloromethyl pivalate. The oily residue was taken up in ethyl acetate (100 ml.) and the resulting solution washed with aqueous sodium bicarbonate and water, dried, and evaporated in vacuo to yield the desired compound as a yellowish gum, which did not crystallize.

(B) 7 - [D(—) - α - aminophenylacetamido] - cephalosporanic acid pivaloyloxymethyl ester hydrochloride To a solution of the compound prepared under A above (10 g.) in ethyl acetate (150 ml.) was added water (50 ml.) and 10% palladium on carbon catalyst (5 g.) in a flask equipped with an efficient stirrer, a gas inlet tube, a gas-outlet tube, a glass-calomel combination electrode, and a burette controlled by an automatic titrator. The system was flushed with nitrogen, whereafter a stream of hydrogen was bubbled through the suspension with stirring, the aqueous phase being maintained at a pH of 3.0 by the addition of 1 N hydrochloric acid via the automatic titrator. When the consumption of acid stopped, the flask was flushed with nitrogen until all hydrogen was removed, and the catalyst was filtered off. The filtrate, which separated into two phases, was separated, and the aqueous phase was washed with ether and freeze-dried. The desired compound was obtained as a colourless amorphous powder, identical with the product prepared as described in Example 1(C).

I claim:
1. A compound of the formula:

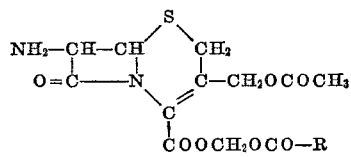

or a hydrochloride thereof wherein R is a lower alkyl radical.

2. Pivaloyloxymethyl 7-aminocephalosporanate.

References Cited

UNITED STATES PATENTS

| | | | |
|---|---|---|---|
| 3,338,897 | 8/1967 | Takano et al. | 260—239.1 |
| 3,340,257 | 9/1967 | Takano et al. | 260—239.1 |
| 3,708,479 | 1/1973 | Welch et al. | 260—243 C |
| 3,697,507 | 10/1972 | Frederiksen et al. | 260—239.1 |

NICHOLAS S. RIZZO, Primary Examiner

U.S. Cl. X.R.

424—246